Dec. 18, 1956  W. T. EVANS  2,774,927
SPEED CONTROL APPARATUS
Filed Aug. 25, 1953  2 Sheets-Sheet 2

INVENTOR.
WILLIAM T. EVANS
BY
ATTORNEYS

United States Patent Office 2,774,927
Patented Dec. 18, 1956

2,774,927

SPEED CONTROL APPARATUS

William T. Evans, Beaumont, Tex., assignor to Sun Oil Company, Philadelphia, Pa., a corporation of New Jersey Application August 25, 1953, Serial No. 376,359

3 Claims. (Cl. 318—314)

This invention relates to speed control apparatus and, more particularly, to apparatus for controlling the speed of the drive motor of a magnetic tape reproducer.

In seismic surveying, the waves resulting from a shot are picked up by detectors and recorded on a record strip. At the present time it is customary to accomplish such recording on a record strip from which the seismic signals may be reproduced and the strip, therefore, is usually a magnetic tape, though variable density photographic records may be used. For consistency of description, recording on a magnetic tape will be primarily referred to herein but with the understanding that recordings of other types may be made with application of the present invention thereto.

The recordings on the magnetic tape may be either at the seismic frequencies, there being multichannel recording involving one channel for each detector, or the seismic signals may be caused to modulate one or more carriers with recording of the modulated carrier or carriers in separate channels on the tape, or if several carriers of substantially different frequencies are modulated, the recording of the modulated carriers may be on a single channel. In any case, the times of occurrence of the events of the seismic signals with respect to the shot instant are of importance and consequently there is always recorded on the magnetic tape a timing signal generally having a frequency of 100 cycles per second to facilitate decimal determinations of time.

Difficulty is experienced in the field in maintaining constant the speed of the tape during recording though approximately constant speed is attained through the use of governor control and a heavy fly wheel of considerable inertia. Despite variations in speed of the tape, the timing signal serves to provide a time scale and, if the magnetic record is merely reproduced as a photographic curve with timing markings also reproduced, the fact that the final record has a non-linear time scale is not particularly serious.

When, however, it is desired to reproduce the original record to give rise to signals which are manipulated in various ways as by subjection to time delays, filtering, or the like, the non-linear time scale of the original record causes difficulties. For example, this is the case when utilization is made of the apparatus and methods which are described in the applications of C. B. Bazzoni, L. G. Ellis and A. C. Winterhalter, Serial No. 339,882, filed March 2, 1953, and L. G. Ellis, Serial No. 339,603, filed March 2, 1953.

Since both electrical and mechanical operations of such devices are dependent upon linearity of the time scale for proper operation, it is desirable to reproduce the record made in the field, which possibly has a non-linear time scale, as a new record having a linear time scale. The control of constant speed of the last mentioned record is satisfactorily effected in the laboratory by the use of controls which are so elaborate as to be impractical in the field. The broad object of the present invention is, therefore, to provide reproduction of field records to secure new records corresponding thereto but having linear time scales. While such new records may also be magnetic ones for utilization in analyzing apparatus of the type described in the aforesaid applications, the new records which are made may be photographic, if desired, or the invention may be utilized in the obtaining of signals having a uniform time scale, which signals may be directly submitted to time delays, filtering, or the like. In brief, the invention is concerned with delivery from a record having a non-linear time scale of signals having a linear time scale for any of the aforesaid purposes.

It may be here remarked that the variations of an original record from linearity may be due not only to variations in the speed at which the magnetic tape was originally driven but may also be due to variations in the dimensions of the tape resulting from varying temperature and humidity conditions, varying tape tension, and slippage of the tape wtih respect to the driving means.

In practicing the invention, use is made of the timing signal on the original record which serves to preserve accurate time records of the occurrences in the seismic record or recrods. In brief, the timing scale is reproduced and compared with a standard frequency timing signal with the production of an output dependent upon phase shifts of the two signals with control of the reproducer motor by such output.

An additional condtion is encountered during the use of the present speed control apparatus in the reproduction of seismic records due to the fact that in the field frequently a plurality of successive recordings are made on a single tape and, between the making of these recordings, the recorders are stopped, whereas when the records are reproduced in a laboratory, it is generally preferred to reproduce the successive records without stopping the tape.

It is, therefore, a further object of the invention to provide speed control apparatus which is responsive to small variations from linearity of the original record but which will not be effective to stop the reproducer motor each time the record from which recordings are being reproduced reaches a point at which the recording apparatus was stopped between the making of successive records in the field. The reproducer is caused to operate at approximately normal speed so that when, after an interval, the reproduction of the seismic records is resumed, there will be no time lag in bringing the reproducer motor up to the required speed. The result will, therefore, be that during the periods of reproduction, which are of interest, an accurately linear time scaling of the output signals will result.

These and other objects of the invention will become apaprent from the following description when read in conjunction with the accompanying drawings in which.

Figure 1:
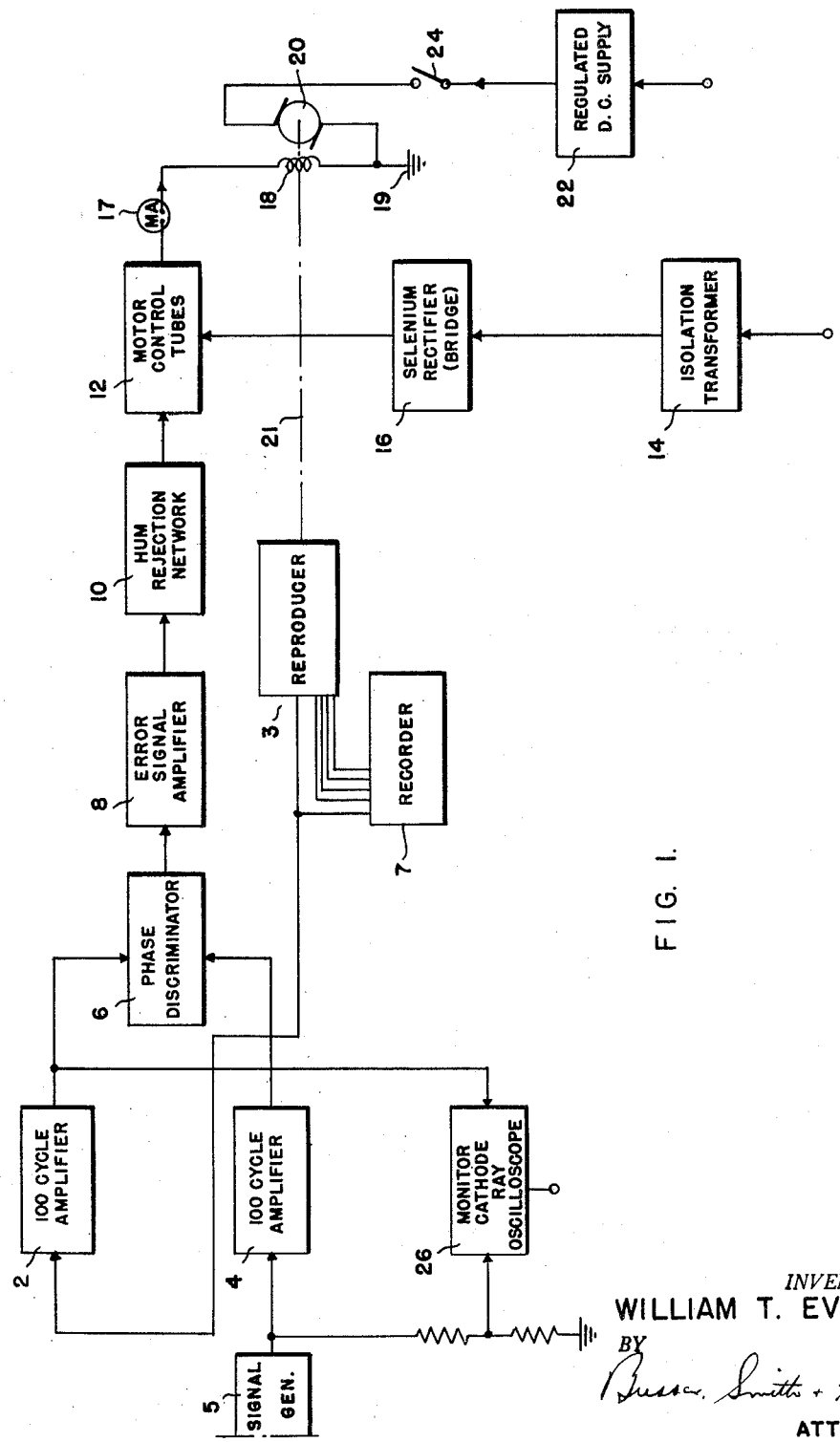
Figure 1 is a schematic diagram of the speed control apparatus.

In Figure 1 there is shown at 2 and 4 a pair of amplifiers. The amplifier 2 is a frequency selective amplifier adapted to receive the timing signal recovered from a record member, such as a magnetic tape, when the tape is played back in a reproducer 3. The reproducer 3 not only reproduces the timing signal on the tape but reproduces in a recorder 7 the seismic signals on the original tape along with, if desired, the timing signal. If the original signals were of seismic frequency, these may be directly reproduced. If modulation of a carrier was involved, demodulation may occur in the reproducer which will deliver the original seismic signals for recording. Alternatively, the modulated carriers may be reproduced for later demodulation and handling. The recorder 7 may be photographic or, if the new record is to be utilized in apparatus of the type described in the aforesaid applications, the new recording may be on a magnetic tape, the last named tape being driven at constant speed in the recorder 7. Alternatively, as indicated above, the signals from the reproducer 3 may directly be subjected to manipulations such as filtering, time delays, or the like. The amplifier 4 is adapted to receive from a suitable fixed frequency signal generator 5 a timing signal of identical frequency to the timing signal which was originally imposed on the record tape at the time the recording was made. The amplified and filtered timing signal from the tape and the amplified timing signal are delivered to a phase discriminator 6.

The phase discriminator receives the two input signals and delivers an error signal to an error signal amplifier 8. The error signal results from any phase displacement existing between the two input signals.

The error signal is amplified in amplifier 8 and the amplified error signal is delivered through a suitable filter, such as a hum rejection network 10, to a bank of motor control tubes indicated at 12.

A transformer 14 receives power from a suitable alternating current source and delivers it to a rectifier bank 16 which provides power to the motor control tubes indicated at 12. The output of the motor control tubes is controlled by the filtered error signal delivered by the hum rejection network and is fed through a milliammeter 17 to the field 18 of a D. C. motor. The armature 20 of the motor receives power through switch 24 from a regulated D. C. power supply 22. The normal output of the error signal amplifier when there is no error signal being fed thereto is such as to control the motor control tubes so that they pass the value of current required to cause the motor to operate at approximately its normal running speed. The motor 18—20 is, of course, as indicated by the construction line 21, the motor driving the record tape in the reproducer 3 from which recovered timing signals are being fed to the amplifier 2.

When it is desired to make a reproduction, the record tape carrying the record to be reproduced is positioned in the reproducer 3. The switch 24 is then closed, energizing the motor armature 20. When the motor is running at approximately normal speed, the control signal from the tape and the timing signal will be just enough out of phase for the amplified error signal plus the preset output of the signal amplifier 8 to hold the current through the control tubes 12 at the proper value to maintain a proper motor speed. If the timing signal being reproduced from the tape starts to change with respect to the standard timing signal, the output of the phase discriminator 6 will change and the amplified change will tend to correct motor speed by adjusting the motor field current. In case of a wide change of control signal frequency such as would occur as a result of the record tape being stopped and started between recordings in the field, the error signal, will lose control and the reproducer motor will continue to run at approximately normal speed until the frequency of the timing signal coming from the tape approaches the frequency of the standard timing signal when the control will take over again.

The condition of synchronism existing between the timing signal being reproduced from the tape and the timing signal produced by the signal generator 5 may be observed on a cathode ray oscilloscope 26 which is connected between the timing signal generator 5 and the output of the amplifier 2.

Figure 2:
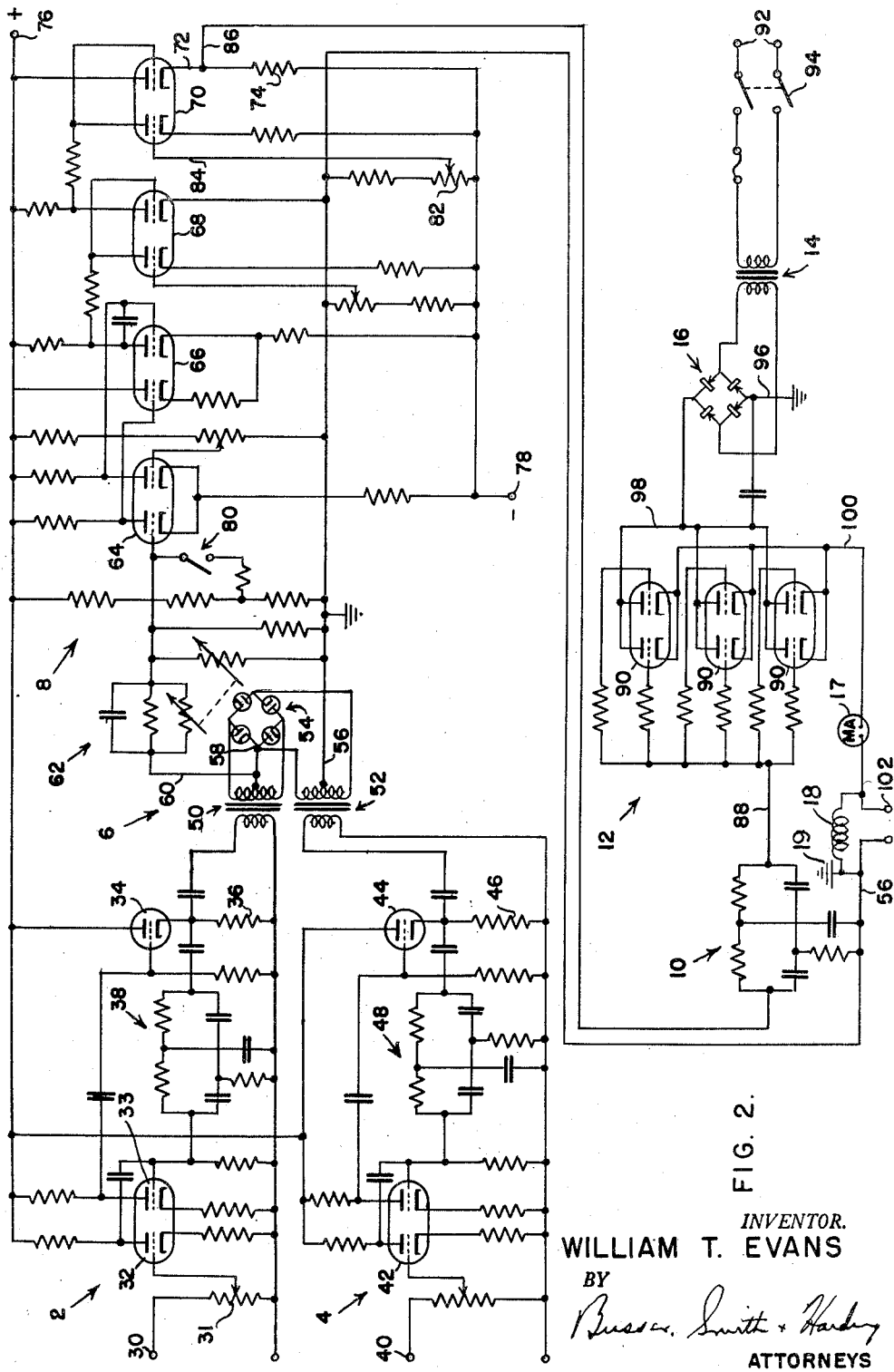
Figure 2 is a circuit diagram of the speed control unit.

Figure 2 illustrates a preferred circuit arrangement which may be employed to control the motor field current in response to the timing signal received from the reproducer and the timing signal received from the signal generator.

The timing signal received from the reproducer 3 is delivered through terminal 30 and the adjustable attenuating potentiometer 31 to the grid of triode 32, forming with a second triode 33 and conventional connections a two stage amplifier. The amplified output from triode 33 is fed to the cathode follower arrangement of triode 34 and cathode resistor 36 and the output of the cathode is fed back to the grid of triode 33 through the parallel T filter network 38 which provides stability and frequency selection. This amplifier serves to amplify the desired frequency signal of 100 cycles and attenuate others, thereby reducing trouble from carrier feedthrough from the demodulator, 60 cycle signal pickup and other extraneous signals. The output of the control signal amplifier is delivered to the primary of transformer 50.

The fixed frequency timing signal delivered by the signal generator 5 is fed to the amplifier 4 through the connection 40 and into the grid of the left side of a twin triode 42. The amplifier 4 is identical to the amplifier 2 and includes, in addition to the twin triode 42, a triode 44 which is adapted to receive the output from the right side of the twin triode 42 and is connected in cathode follower arrangement with a resistance 46. The amplifier 4 also includes a parallel T network indicated generally at 48 to provide frequency selection. The output from the amplifier 4 is delivered to the primary of a transformer 52.

The phase discriminator 6 consists of a network including the secondary coils of the transformers 50 and 52 and four diodes connected in bridge arrangement as indicated at 54. The outputs of the transformers 50 and 52 are connected across opposite corners of the bridge arrangement 54. The neutral tap of the secondary of transformer 52 is connected to ground through conductor 56 and the neutral tap of secondary of transformer 50 is connected to the corner 58 of the bridge in common with one side of the secondary of transformer 52. The output of the discriminator is taken from the corner 58 of the bridge 54 and is responsive to phase displacements between the outputs of transformers 50 and 52.

The output of the discriminator is fed through line 60 into an adjustable network indicated at 62 for stabilizing the system. This network is of the type described in "Servo Mechanisms and Regulating System Design," Chestnut and Mayer, McGraw-Hill, page 177.

The output of the stabilizing network 62 is fed to the grid of the left-hand triode of a twin triode 64 of the error signal amplifier indicated generally at 8. This amplifier is a direct coupled amplifier and is essentially the same as that shown in volume 21 M. I. T. Series "Electronic Instruments," Figures 12–37, page 421. The amplifier includes twin triodes 64, 66, 68 and 70. The output of the amplifier is taken from the cathode 72 of the right-hand triode of the twin triode 70 which is connected in cathode follower arrangement with the resistance 74. A suitable source of positive potential is connected at 76 and a suitable source of negative potential is connected at 78.

A test switch indicated generally at 80 is provided in order that a small voltage may be applied to the input grid of the left-hand triode of the twin triode 64 for test purposes. The output level of the amplifier may be adjusted to a neutral or zero value by the potentiometer 82 in the grid circuit of the left-hand triode of the twin triode 70 which is connected in feedback arrangement with the right-hand triode thereof. This potentiometer provides for adjustment of the reproducer motor speed to a normal speed in the absence of control signal from the reproducer.

The output of the amplifier 8 is taken from line 72 and delivered through the line 86 to the hum rejection network indicated generally at 10. Inasmuch as the amplifier 8 serves to amplify power supply ripple, the hum rejection network is desirably included. The hum rejection network is in the form of a parallel T network tuned to 120 cycles per second.

The amplified and filtered signal is delivered through line 88 to the grids of a bank of twin power triodes 90, connected in parallel to supply sufficient current for the motor field.

The power supply for the twin triode power tubes is received from a suitable alternating current source connected to the terminals 92 and delivered through a disconnect switch 94, the power transformer 14, and the rectifier bridge 16. The cathodes of the tubes 90 are connected in parallel to line 100 and line 100 is connected through the milliammeter 17 and terminal 102 to one side of the field 18 of the reproducer motor. The other side of the motor field is connected to ground through line 56.

As previously noted, when the apparatus is used in conjunction with seismic recording, a record member is involved on which a number of recordings have been made consecutively on a strip with the recorder having been started and stopped between each recording. In reproducing these recordings, it is generally desirable to reproduce several successive recordings without stopping the reproducer between successive records. The recorder motor speed is controlled by a contactor type centrifugal governor and has a heavy flywheel with considerable inertia and, thus, the speed variations during the course of recording are relatively slow. It is necessary, therefore, that the reproducer motor speed control follow these slow speed variations and provide the necessary compensating control without trying to stop the reproducer motor each time the record from which recordings are being reproduced reaches a point at which the recording apparatus was stopped between the making of successive recordings. This type of control is accomplished by limiting the range of control and by using the phase discriminator described.

In operation of the speed control apparatus, the field 18 of the reproducer motor is energized at all times through the control system, and the armature current of the motor is interrupted by means of the switch 24 until it is desired to drive the reproducer. The reproducer motor selected has a low field resistance and it is placed in the cathode circuit of the power control tubes thus eliminating the danger of breakdown from high voltage which would be applied to the field if it were placed in the plate circuit. The motor field resistance is selected to be of about the value to provide proper cathode bias for rated field current with zero grid voltage applied to the tubes 90. The value of the grid voltage, which is the output of the error signal amplifier 8, is set by means of the output level potentiometer 82. The resulting cathode current, which may be read on the milliammeter 17, is selected to cause the motor to run at about normal speed in the absence of a control signal from the recording being reproduced.

From the foregoing, it will be evident that so long as the reproducer 3 delivers a timing signal its speed will be controlled to give rise to an output of the seismic signals to a linear time scale. When the timing scale is not emitted, corresponding to a gap between the original records, the control system loses control but the reproducer motor continues to run at approximately normal speed so that when the next seismic record is to be reproduced, there will be no lag in bringing the motor up to the required speed range.

Thus an apparatus is provided which will control the speed of a record driving motor during reproduction of records at a speed which will provide for the reproduction of the records uniformly in the same time scale as the original recorded signals at the time of their recording. It will be evident that modifications may be made to the embodiment of the invention disclosed herein without departing from the scope of the invention as set forth in the following claims.

What is claimed is:

1. Apparatus for controlling the speed of a record driving motor during reproduction of a signal from a record driven thereby comprising means for producing a signal related to the recorded signal as it existed at the time of its recording, a phase discriminator producing an output responsive to phase displacements between the produced signal and the reproduced signal, and means controlled by said output for regulating current flow to the record driving motor to control the speed of the record driving motor.

2. Apparatus for controlling the speed of a record driving motor during reproduction of a signal from a record driven thereby comprising means for reproducing a signal from a record driven by a record driving motor means for producing a signal related to the recorded signal as it existed at the time of its recording, means producing an output responsive to dissimilarities between the produced signal and the reproduced signal, and means supplying current to said record driving motor normally driving said motor at approximately operating speed and including a power tube having its grid connected to said output and its cathods connected to the record driving motor for regulating the speed of the motor in response to said output.

3. Apparatus for controlling the speed of a record driving motor during reproduction of a signal from a record driven thereby comprising means for reproducing a signal from a record driven by a record driving motor means for producing a signal related to the recorded signal as it existed at the time of its recording, means supplying current to said record driving motor normally driving said motor at approximately normal operating speed, and means responsive to dissimilarities between said produced signal and said reproduced signal for regulating said current supplying means to regulate the speed of said motor.

References Cited in the file of this patent

UNITED STATES PATENTS

| | | |
|---|---|---|
| 2,334,510 | Roberts | Nov. 16, 1943 |
| 2,496,103 | Neufeld | Jan. 31, 1950 |
| 2,542,189 | Gates et al. | Feb. 20, 1951 |
| 2,576,760 | Jones et al. | Nov. 27, 1951 |
| 2,627,596 | Andrews | Feb. 3, 1953 |
| 2,656,419 | Dingley | Oct. 30, 1953 |